United States Patent [19]

Fennern

[11] Patent Number: 5,171,522
[45] Date of Patent: Dec. 15, 1992

[54] FUEL DESIGN FOR HIGH POWER DENSITY FORCED CIRCULATION BOILING WATER REACTOR

[75] Inventor: Larry E. Fennern, San Jose, Calif.

[73] Assignee: General Electric Company, San Jose, Calif.

[21] Appl. No.: 783,804

[22] Filed: Oct. 28, 1991

[51] Int. Cl.$^5$ .............................................. G21C 3/32
[52] U.S. Cl. .................................. 376/444; 376/352; 376/370; 376/210
[58] Field of Search ............... 376/352, 444, 370, 210, 376/448, 447; 976/DIG. 63, DIG. 60

[56] References Cited

U.S. PATENT DOCUMENTS

| | | | |
|---|---|---|---|
| 4,526,746 | 7/1985 | Fredin | 376/444 |
| 4,652,426 | 3/1987 | Boyle et al. | 376/352 |
| 5,023,047 | 6/1991 | Nishida et al. | 376/370 |

Primary Examiner—Brooks H. Hunt
Assistant Examiner—Meena Chelliah
Attorney, Agent, or Firm—Robert R. Schroeder

[57] ABSTRACT

A fuel bundle of square cross section and standard vertical dimension is disclosed. The fuel bundle includes a matrix of upstanding vertical rods, a lower tie plate for supporting the matrix of vertical rods and permitting the inflow of liquid moderator coolant (preferably light water), and upper tie plate for holding the matrix of vertical fuel rods upright and permitting the outflow of liquid and vapor moderator coolant (water and steam), and a preferably square sectioned channel extending between the tie plate for confining the flow path between the tie plate around the fuel bundle. The novel characteristics of the invention is the introduction of a corresponding matrix of water rods (cylindrical rods with liquid phase water flow) positioned between the fuel rods, as opposed to the current practice of using or displacing a subset of fuel rods with large central water rod(s) for this purpose. This matrix of water rods preferably has each water rod of smaller diameter than the adjoining fuel rods and is dispersed at intervals uniformly in the matrix of fuel rods. This geometry provides for more uniform (flat) power distributions within the bundle, as a result of the greater similarity of the neutron spectrum in the vicinity of the individual fuel rods. This geometry yields increased design margins for MLGHR and MCPR relative to current fuel designs. The design margins can be traded off to permit achievement of higher core power density. The design also results in less negative void coefficients, which improves core stability.

6 Claims, 5 Drawing Sheets

FUEL DESIGN FOR HIGH POWER DENSITY FORCED CIRCULATION BOILING WATER REACTOR

This invention relates to a boiling water nuclear reactor having high power density. More specifically, a fuel bundle construction is set forth in which a matrix of fuel rods has a corresponding matrix of water rods interstitially spaced with the fuel rods in a uniform array. In the preferred embodiment, the matrix of water rods is less in number than the matrix of fuel rods with the water rods having a lesser diameter than the fuel rods.

BACKGROUND OF THE INVENTION

Problem Statement

Boiling water reactor power densities have been limited in the past to less than 56 kilowatts per liter (KW/l), primarily as a result of their original designs. These designs constrain the power outputs of these reactors due to thermal limits and stability considerations. Thermal limits include the maximum linear heat generation rate and the minimum critical power ratio.

The maximum linear heat generation rate (MLHGR) is that maximum amount of heat output by a lineal foot of fuel rod. Normal MLHGR rates for a boiling water nuclear reactor are in the range of 12.1 to 14.4 Kw/ft or, in pure metric units, 40 to 47 Kw/m. Simply stated, the MLHGR is a limitation established by the fuel pellet swelling and establishing a mechanical interference with the cladding containing the fuel rod. The MLHGR cannot be exceeded at any individual fuel rod within a fuel bundle without potential damage to that particular fuel rod within the fuel bundle. As no individual rod is permitted to be damaged within a fuel bundle, the entire bundle is limited in its performance to maintain the maximum linear heat generation rate in any given fuel rod location. It is to be understood that to the extent a particular bundle constituting part of a reactor core is limited in its output, the entire core is likewise limited.

The minimum critical power ratio (MCPR) is the ratio of that level of fuel bundle power at which some point experiences transition from nucleate to film boiling compared to the then present output of the fuel bundle. This ratio is not permitted to be less than a numerical value of one anywhere within an individual fuel bundle. If the limit were to be exceeded at any given location within the fuel bundle, the temperature of the cladding of the fuel rod would rapidly increase due to increased resistance in the heat flow path from the interior of the fuel rod to the exterior of the fuel rod. Potential failure of the particular fuel rod cladding could follow.

The concept of a ratio is utilized in establishing limits of critical power within the fuel bundle. The ratio is maintained at a limit where operating conditions—both expected in normal operations and during anticipated abnormal operating occurrences or "transients"—can occur without running the risk of damage to the sealed fuel rods within the reactor.

In already designed nuclear reactors, these thermal limits are largely established by the original design. There is, however, a need to increase the power output density of nuclear reactors of new manufacture.

Accordingly, the factors relating to the power output densities will be briefly reviewed. Conventional fuel designs will be briefly discussed, especially in so far as they incorporate many heterogenous distributions in their neutron density and related power output. Thereafter, reference will be made to certain new reactor designs.

Regarding the factors relating to increasing power densities, vessel sizes are limited in diameter to approximately seven meters, given the desire to continue to use forging to manufacture such vessels in existing manufacturing facilities capabilities. There exists a reluctance to expand vessel fabrication facilities beyond existing size limits under present market realities. Therefore, each reactor vessel is practically limited in its diameter. This requires that the number of fuel bundles within a BWR core is therefore limited.

Limitations also exist in establishing the active fuel length of fuel rod bundles since as fuel rod length increases, thermal margins and stability become of concern. The longer the fuel bundle, the greater the possibility of transition boiling unless considerable additional inlet coolant flow is provided. This is aggravated, however, by the higher fuel bundle pressure drop associated with increased length inlet flowrate. Further, stability at certain power rates requires rods be maintained short. If the boiling length is too long and the two phase pressure drop too high, thermal-hydraulic, and thermal-hydraulic-nuclear instabilities arise. As a practical matter, the active fuel length is limited to about 12.5 feet or, 3.81 m using metric units.

Once it is understood that both vessel diameter and fuel rod length are limited as a practical matter, it becomes clear that the total reactor volume available in any given reactor vessel approaches a limit. Therefore, the practical volume limit for a reactor is about 100,000 liters.

When a reactor is built, many costs are fixed and constant regardless of the power output of the installed plant. If the installed plant can have a higher power density, these fixed and constant costs become substantially more efficient.

Thus, there is a need for a new fuel design approach with potential to achieve higher power density to reduce the capital costs of nuclear reactors. This will enable any given reactor to have higher power output.

The forced circulation boiling water reactor is one alternative reactor that is able to achieve the higher power density requirements. Simply stated, such reactors—by forcing the flow of coolant along internal paths—have the ability to concentrate more power in a given plant location.

CONVENTIONAL FUEL DESIGNS

Conventional fuel designs for boiling water reactors include discrete fuel bundles having groups of vertically upstanding fuel rods supported on a lower tie plate and maintained vertical by an upper tie plate. A channel surrounds the vertically upstanding fuel rods between the tie plates and isolates the fluid flow between the tie plates from the rest of the reactor. Among other things, this arrangement allows predictability of fuel bundle performance down to the fuel bundle level.

The chief concern with the design of modern fuel bundles has been nuclear efficiency improvement. Specifically, fuel bundles are designed to extract the maximum energy from the loaded nuclear fuel undergoing fission, typically by striving for uniform fuel rod power levels while minimizing the introduction of neutron absorbing materials in the core.

For a number of practical reasons, however, modern fuel bundles utilized in boiling water reactors are not uniform and include heterogenous power outputs on the individual fuel rods within the fuel bundles. For example, the fuel bundle channels are surrounded on the outside by the so-called core bypass volume exterior of the fuel bundle, a volume which is filled with water during operation. For shutdown purposes, the water is displaced by the insertion of control rod blades. Furthermore, nuclear instruments which measure neutron and gamma flux in the core for the purpose of measuring local and global power levels are also located in the water filled bypass region.

As a consequence, the fuel rods adjacent to the channel operate in a higher thermal neutron flux due to neutron moderation in the bypass water (which is greater than the moderation provided by the steam/water mixture interior to the bundle) and thus produce more power. To counter this, fuel enrichment is varied relative to these variant fast and slow neutron flux densities, and water rods replace select interior fuel rod locations for adding required fast neutron moderation with the end of maximum energy extraction in mind.

For at least these reasons, although the fuel bundles are isolated into discrete—and hence predictable increments—the discrete fuel rods within modern fuel bundles are not homogenous relative to one another in their power output.

When the fuel rods within any given fuel bundle are not homogenous, this as a practical matter means that some portions of the fuel bundles reach their thermal limits before other portions of the fuel bundles. Those having skill in the art will understand that once a thermal limit is reached anywhere within a fuel bundle, the other portions of that same fuel bundle, and possibly other fuel bundles in the reactor core, are limited to that power output where the local thermal limit will not be exceeded.

Although modern fuel design has been concerned with nuclear efficiency, when contemplating the appropriate power density for a new nuclear power plant design, there is a tradeoff between nuclear efficiency as it may impact energy utilization and fuel cycle costs—which generally favors low power density—and the fixed plant capital costs incurred at the time of plant construction—which favor high power density to gain improvement in economy of scale. For a high power density plant, certain conventional design constraints in establishing fuel bundle design will be ignored. Since this is the case, the reader will understand that the invention is claimed in so far as departure from these conventional design constraints are concerned. Thus the realization that fuel cycle costs are secondary to plant capital outlay as a practical matter and the concession of nuclear efficiency as a traditional constraint are part of the invention set forth in the following specification.

SUMMARY OF THE INVENTION

A fuel bundle of square cross section and standard vertical dimension is disclosed. The fuel bundle includes the conventional combination of a matrix of upstanding vertical rods, a lower tie plate for supporting the matrix of vertical rods and permitting the inflow of liquid moderator coolant (preferably light water), and an upper tie plate for holding the matrix of vertical fuel rods upright and permitting the outflow of liquid and vapor moderator coolant (water and steam). A conventional and preferably square sectioned channel extending between the tie plate for confining the flow path between the tie plate around the fuel bundle is utilized. The novel characteristic of the invention is the introduction of a corresponding matrix of water rods (cylindrical rods with liquid phase water flow) positioned between the fuel rods. This is opposed to the current practice of using or displacing a subset of fuel rods with large central water rod(s) for this purpose. This matrix of water rods preferably has each water rod of smaller diameter than the adjoining fuel rods and is dispersed at intervals uniformly in the matrix of fuel rods. This geometry provides for more uniform (flat) power distributions within the bundle, as a result of the greater similarity of the neutron spectrum in the vicinity of the individual fuel rods. This yields increased design margins for MLGHR and MCPR relative to current fuel designs. The design margins can be traded off to permit achievement of higher core power density. The design also results in less negative void coefficients, which improves core stability.

DESCRIPTION OF THE PREFERRED EMBODIMENT

Figure 1:
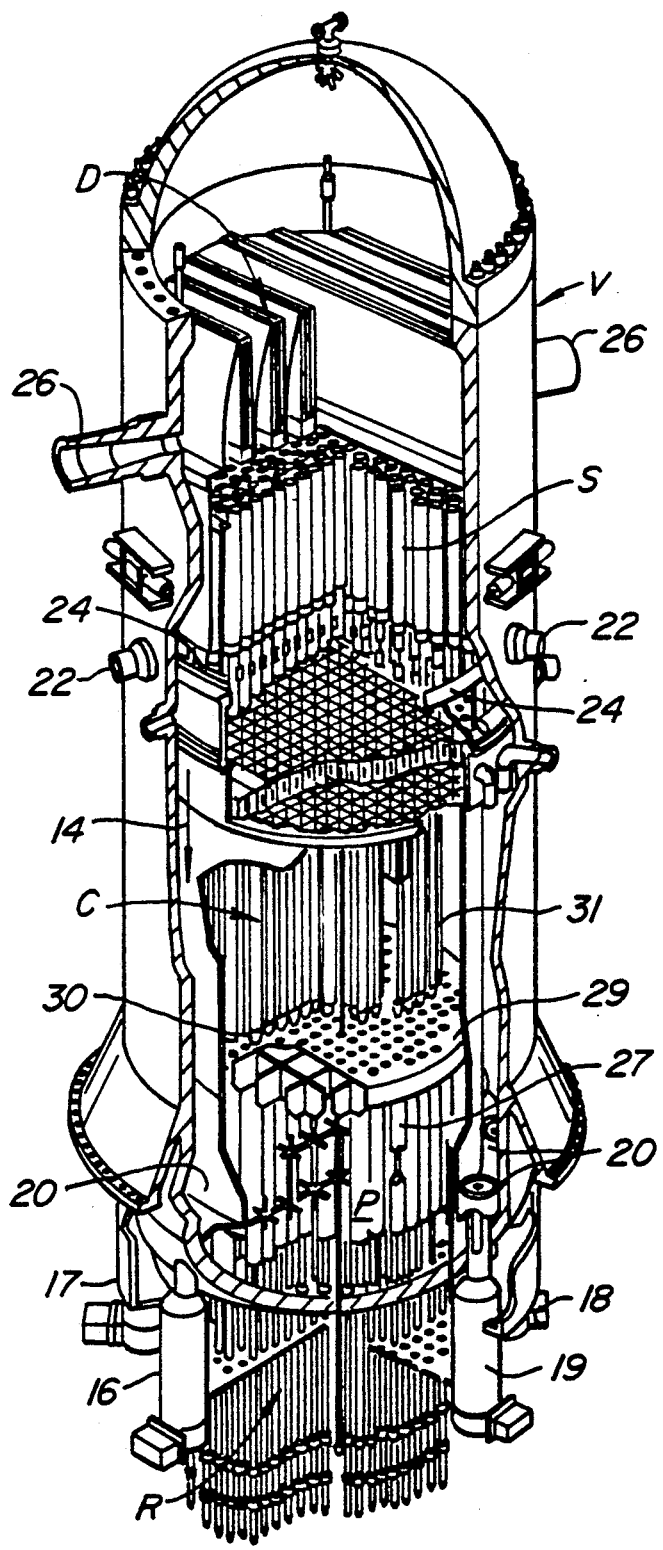
FIG. 1 is a perspective view of a forced circulation boiling water reactor in which internal shaft driven reactor pumps cause forced circulation for enabling higher power densities to be achieved within the limited volume of the reactor vessel.

Referring to FIG. 1, a reactor vessel V is shown in section for a forced circulation boiling water reactor. The reactor contains a core C with a plenum P therebelow. A plurality of control rods R extending through plenum P penetrate on a selected basis to control reactive output of the core C in its fission reaction The vessel V includes a circuitous flow path which includes upward flow through core C into steam separators S and steam dryers D. Liquid rejected by the separators S passes downwardly between the core and the outside wall of the vessel in the direction of vector 14 and into the plenum P. At plenum P, the water again circulates up through the core.

This reactor is a forced circulation reactor including pumps 16-19, which each include propellers 20 for drawing the water downwardly along the sides of the core, and into plenum P. At plenum P, released water passes upwardly through the core, repeating in a cycle of endless circulation, the flow path here described.

Typically, feed water is introduced at an inlet 22 and disbursed through spargers 24. Likewise, steam for energy extraction is discharged from outlets 26 with extraction occurring at conventional turbines and condensers (not shown). Discharge from the condensers occurs to feed water makeup apparatus (also not shown) with return at apertures 22 of the reactor.

The bottom of the core includes a boundary known as core plate 30. Core plate 30 forms a hydraulic boundary at the bottom or entrance to core C. This boundary can further be understood with reference to FIG. 2.

Figure 2:
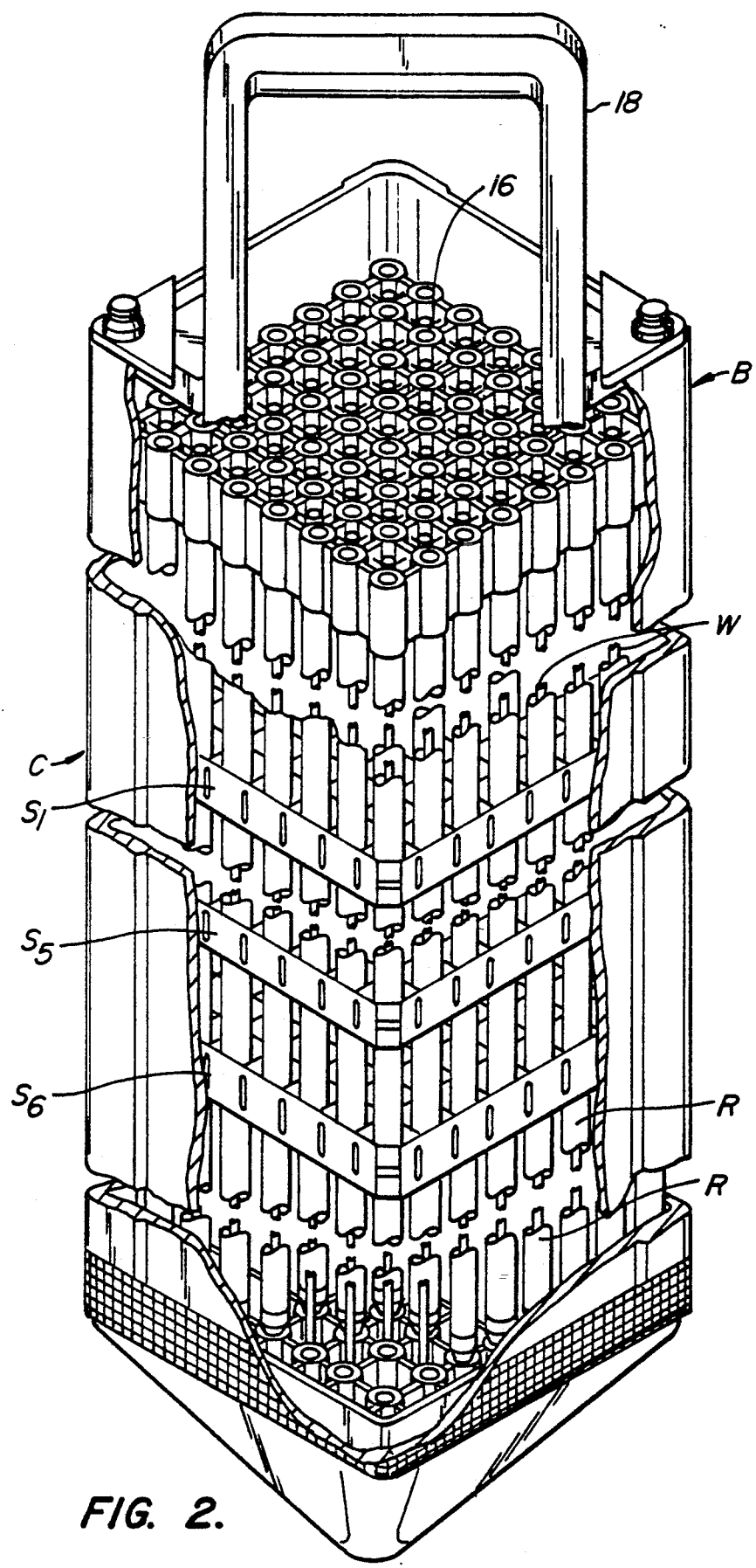
FIG. 2 is a perspective view of the fuel bundle of this invention, the view here illustrating the disbursing of a matrix of smaller water rods interior of a matrix of fuel rods.

Referring to FIG. 2, fuel bundle B which is a segment of core C is illustrated. Bundle B includes a lower tie plate 14 and an upper tie plate 16, between the respective tie plates, and as more particularly shown in FIG. 3. There are two matrices of upstanding vertical rods.

Figure 3:
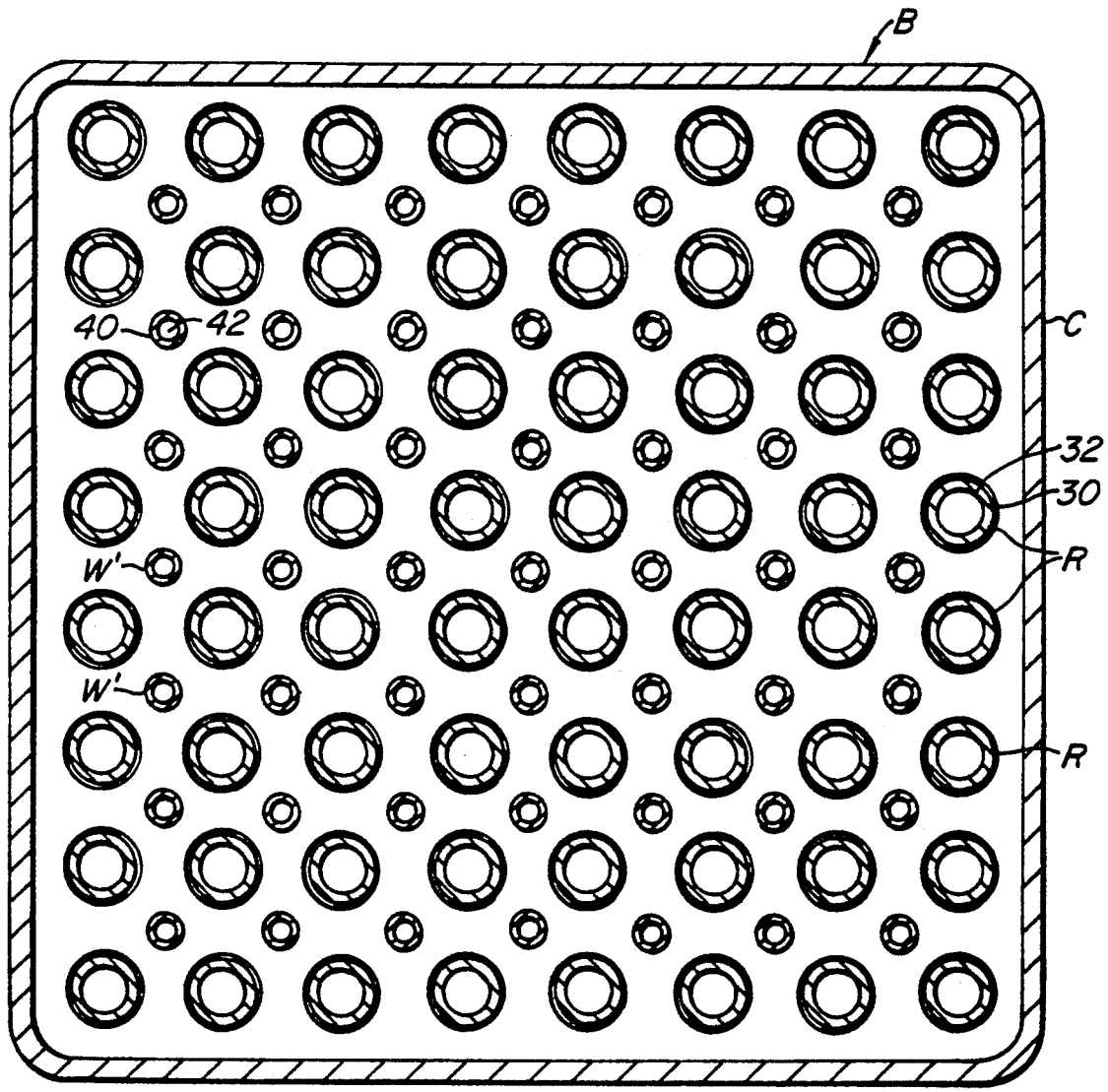
FIG. 3 is a plan section of the view of FIG. 2 setting forth the distribution of the fuel rods and water rods.

Referring momentarily to FIG. 3, the first matrices of rods includes fuel rods R. As shown in FIG. 3, these rods are aligned in an $8 \times 8$ matrix.

There is a second matrix of upstanding rods. These upstanding rods are water rods W. This matrix constitutes a $7 \times 7$ matrix of fuel rods which matrix is interleaved with respect to the matrix of fuel rods R.

Returning to the view of FIG. 1, the remainder of the new fuel design can be understood. As is conventional, both the matrix of fuel rods and water rods are surrounded and held spaced apart from a square section channel wall C by a plurality of spacers S1-S6 (it being noted that only spacers S1, S5 and S6 are shown in FIG. 2).

The remaining constructions of the fuel bundle are conventional. A handle 18 is utilized for manipulation of the fuel bundle.

A brief discussion may be had about the parameters of the disclosed fuel bundle.

In this design, channel C is retained. Preferably, the cross-section of the channel has increased dimensions. By way of example, a normal square section fuel bundle channel has approximately a 6" by 6" (or 152.4 mm) dimension. Fuel bundle channels of 6" by 6" dimensions to 12" by 12" (or 304.8 mm) dimensions are contemplated for this invention.

The water gaps between the channels are decreased relative to the size of the channels. Such decreasing occurs while still retaining acceptable control characteristics. For example, it is important that the interstitial space between adjoined channels be capable of penetration by cruciform sectioned control rods.

By way of example, interstitial spacings between channels in the order of 0.782 inches (or 19.9 mm) are contemplated.

The reader will appreciate that the novel characteristic of the invention is the introduction of the matrix of water rods. These water rods include cylindrical tubes having their interior filled with water. This will be realized to be opposed to the current practice of using or displacing a subset of fuel rods with a large diameter water rod for this purpose.

The reader will recognize that the distribution of coolant in the liquid phase in the resulting geometry is more uniform. Hence, it is possible to have a more even power distribution. Such a power distribution is usually characterized as "flat", and enables each individual fuel bundle to approach its operating limit. As a result, the neutron spectrum in the vicinity of the fuel rods has more uniformity across the core. Further, there are smaller differences in the fuel rod to fuel rod power. This enables increased design margins for MLGHR (maximum linear heat generation rate) and MCPR (maximum critical power ratio) relative to current fuel designs. In short, the increased design margins achieved by the uniform power distribution permit higher core power density.

The reader will note that the changes described also result in less negative void coefficient. That is to say, the uniform distribution of cross-sectional fluid flow provides effective moderation in the interior portions of the fuel bundle even where vapor preferentially accumulates in the upper portion of the fuel bundle.

Consequently, core instability which includes thermal hydraulic coupled nuclear feedback at certain power and flow conditions is avoided.

As a consequence, this fuel design can support higher power densities.

It is apparent that this design contains additional structural material. Specifically, the added metallic material 40 of the water rods W constitutes a parasitic neutron absorber. This carries a neutron penalty.

Understanding the philosophy of this design, the reader will understand that this penalty is offset by improvements in the power distributions and the lower capital costs of the plant. I prefer to have a larger cross section to the fuel bundle with a concomitant increase in fuel rod and water rod size to minimize any remaining penalty.

Figure 4:
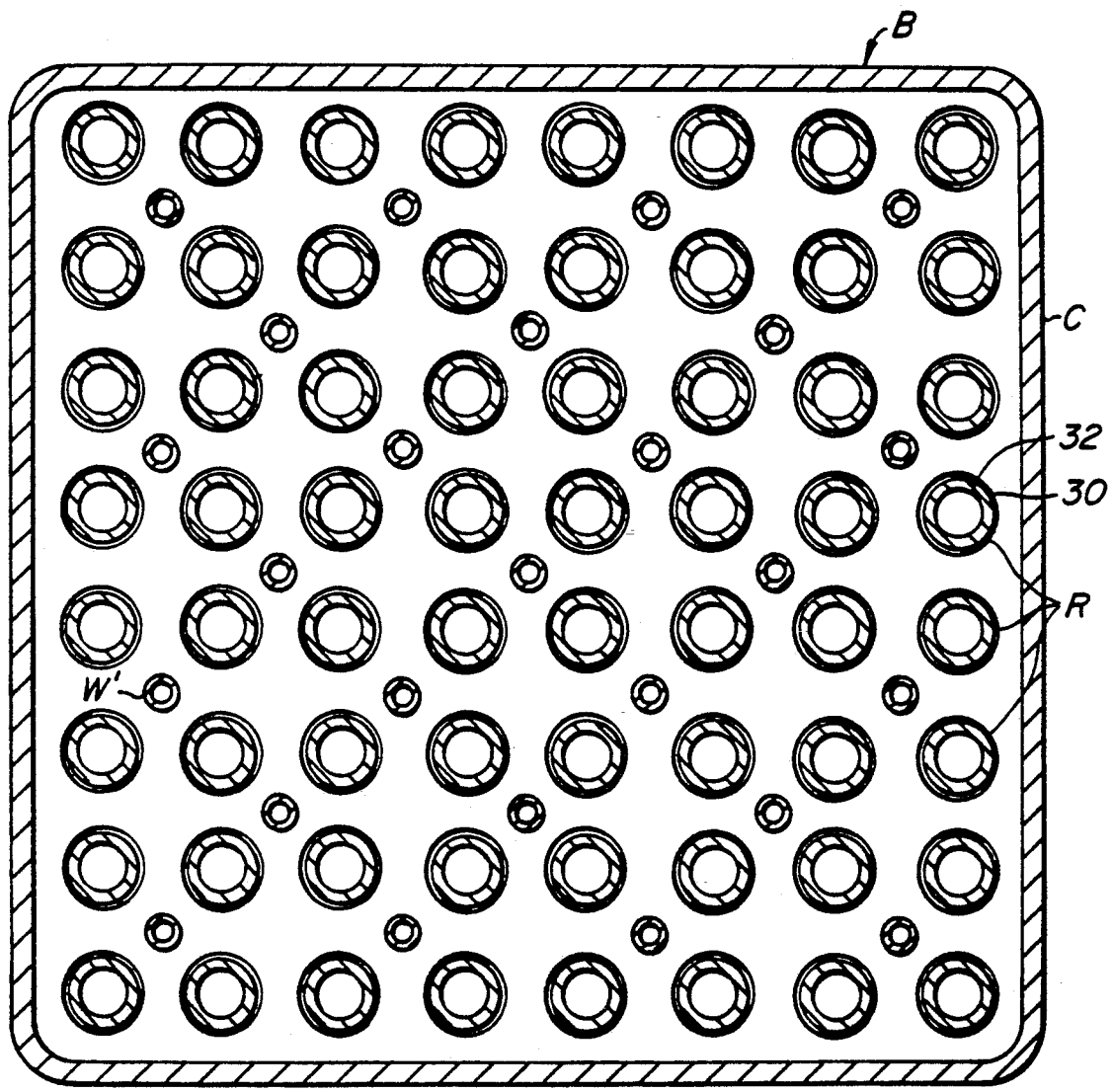
FIG. 4 is an alternate plan section of the view of FIG. 2 here illustrating a reduced number of water rods in the disclosed water rod matrix.
Figure 5:
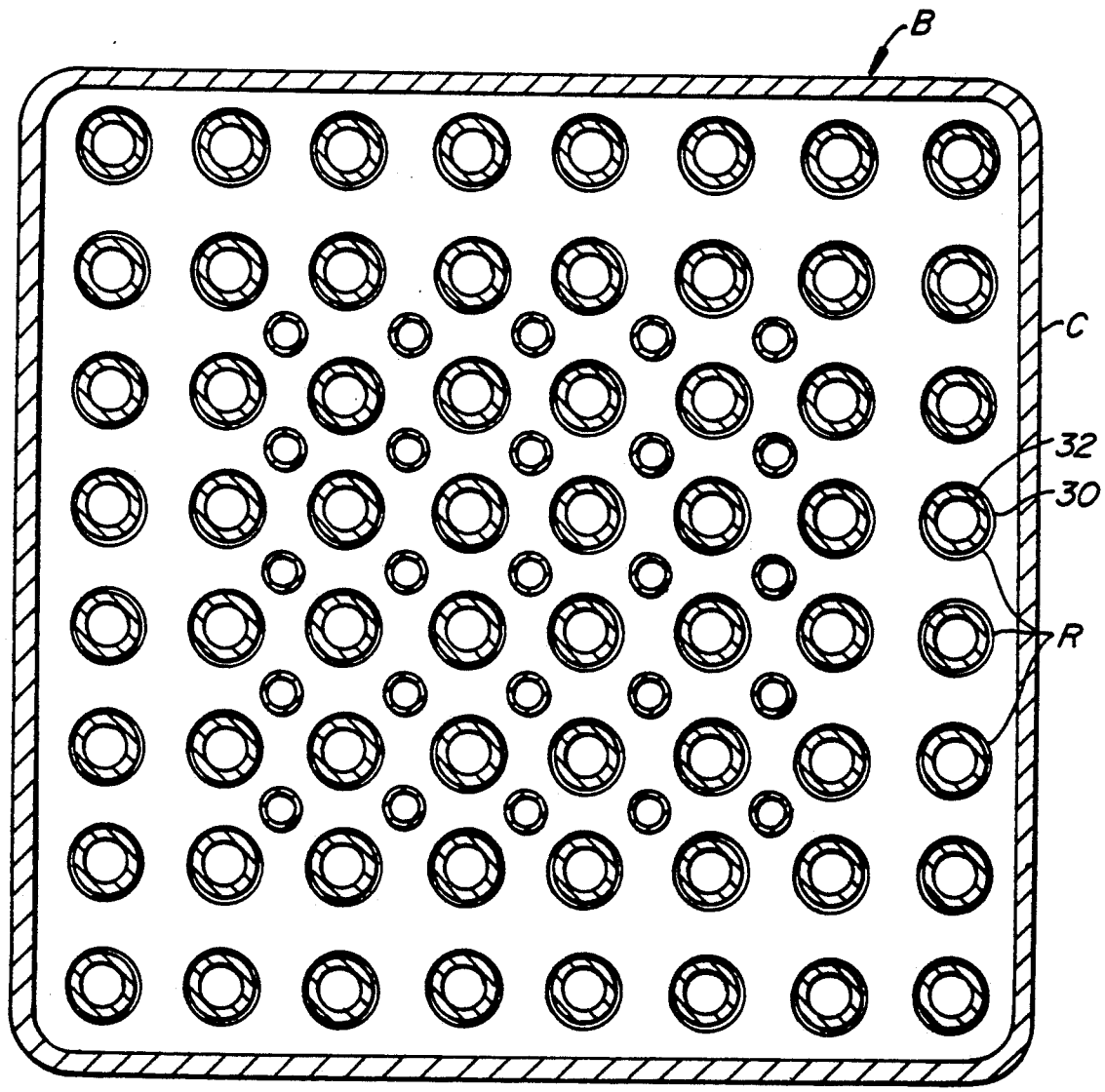
FIG. 5 is another alternate plan section view of FIG. 2 here illustrating another approach to reduced number of water rods in the disclosed water rod matrix.

The reader will understand that with respect to FIG. 4 and 5, it is not required in the practice of this invention that the matrices of fuel rods and water rods interleave on a one-to-one basis.

Referring to FIG. 4, a matrix similar to that shown in FIG. 3 is set forth. However, it will be noted that in the water rod matrix, every other water rod has been omitted Thus, in the outside rows, the corner water rods are present. In the remaining rows, every other water rod is omitted Thus, a matrix is disclosed which has 25 distributed rods.

Referring to FIG. 5, a matrix similar to that shown in FIG. 3 is set forth. However, it will be noted that in the water rod matrix, water rods in the rows closest to the channels and the associated water gap between fuel assemblies are omitted. Only interior water rods two or more interstitial rows away from the channel walls are retained.

It is understood that the water rods are preferred to be of a smaller diameter than the fuel rods. Diameters of water rods up to and including the diameter of the fuel rods are included in this disclosure.

What is claimed is:

1. In a core for a boiling water nuclear reactor wherein said reactor includes:

a reactor pressure vessel;

a core central of said pressure vessel for containing fuel in sealed tubes for undergoing fission reaction;

moderator coolant for circulation through said pressure vessel for extracting the heat of fission from said sealed tubes;

a defined flow path for circulation of said moderator coolant through said vessel including an upwardly passing leg in said flow path from the bottom of said core to the top of said core for the generation of vapor coolant;

a power discharge path exterior of said pressure vessel for the discharge of energy imparted at said core to said moderator coolant; and, a moderator-coolant inflow for resupplying said reactor with moderator coolant for producing in said vessel a continuous power generation cycle;

the improvement to said core comprising:

a plurality of side-by-side fuel bundles, each said bundle comprising;

a first matrix of vertical fuel rods;

a second matrix of vertical water rods, said second matrix interspersed in said first matrix for the uniform distribution of said second matrix of water rods within said first matrix of fuel rods;

a lower tie plate for supporting said first matrix of fuel rods, supporting said second matrix of water rods, and permitting the inflow of liquid moderator coolant about said fuel rods;

an upper tie plate for said supporting at the upper end said first matrix of fuel rods the upper end, supporting at the upper end said second matrix of water rods, and permitting the outflow liquid and vapor moderator coolant;

a channel for surrounding said lower tie plate, said first and second matrix of water fuel and water rods to define a flow path through said first and second matrix of fuel and water rods between said tie plates.

2. The invention of claim 1 and wherein said water rods have a diameter less than said fuel rods.

3. The invention of claim 1 and wherein said matrix of water rods is lesser in total number than said matrix of fuel rods.

4. A fuel bundle for placement to a boiling water reactor core having an array of similar side-by-side fuel bundles, said bundle comprising;

a first matrix of vertical fuel rods;

a second matrix of vertical water rods, said second matrix interspersed in said first matrix for the uniform distribution of said second matrix of water rods within said first matrix of fuel rods;

a lower tie plate for supporting said first matrix of fuel rods, supporting said second matrix of water rods, and permitting the inflow of liquid moderator coolant about said fuel rods;

an upper tie plate for said supporting at the upper end said first matrix of fuel rods the upper end, supporting at the upper end said second matrix of water rods, and permitting the outflow liquid and vapor moderator coolant;

a channel for surrounding said lower tie plate, said first and second matrix of fuel and water rods to define a flow path through said first and second matrix of fuel and water rods between said tie plates 5. The invention of claim 4 and wherein said water rods have a diameter less than said fuel rods.

6. The invention of claim 4 and wherein said matrix of water rods is lesser in total number than said matrix of fuel rods.

* * * * *